Sept. 25, 1934.　　　A. G. REDMOND　　　1,974,691

ELECTRIC MOTOR

Original Filed Aug. 12, 1930

Inventor
A. G. Redmond.

By Pallium Wright & Pallium
Attorneys

Patented Sept. 25, 1934

1,974,691

UNITED STATES PATENT OFFICE 1,974,691

ELECTRIC MOTOR

Albert G. Redmond, Flint, Mich.

Original application August 12, 1930, Serial No. 474,796, now Patent No. 1,896,972. Divided and this application September 3, 1932, Serial No. 631,698

1 Claim. (Cl. 308—132)

This invention relates to certain new and useful improvements in electric motors and more particularly to the bearing for the armature shaft thereof, the object being to provide a lubricating bearing formed of powdered copper and graphite mounted within a casing and surrounded by a felt ring adapted to absorb the lubricant so as to maintain the bearing thoroughly lubricated.

Another object of my invention is to provide novel means for mounting the bearing in the motor housing whereby a self-aligning bearing is produced.

Another object of my invention is to provide means for eliminating the noise caused by end play of the armature shaft by providing washers formed of canvas impregnated with linseed oil and baked.

A still further object of the invention is to provide an electric motor which is especially adapted to be used in connection with hot water heaters for motor cars where means is provided for taking up the shock of the vibration of the car by having the armature shaft mounted in movable bearings so that the bearings will be self-aligning and by the provision of cushion members, eliminates the noise caused by the end play of the armature shaft.

Other and further objects and advantages of the invention will be hereinafter set forth and the novel features thereof defined by the appended claim.

Figure 1:
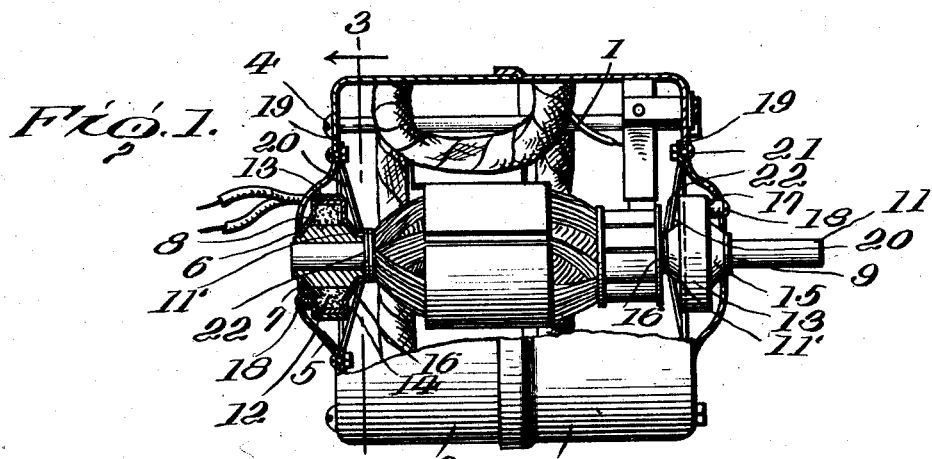
Figure 1 is a side elevation, partly in section, of an electric motor constructed in accordance with my invention.
Figure 2:
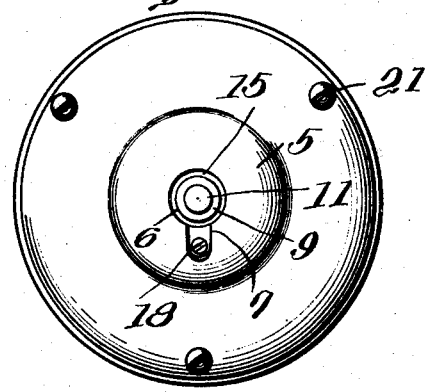
Figure 2 is an end elevation.
Figure 3:
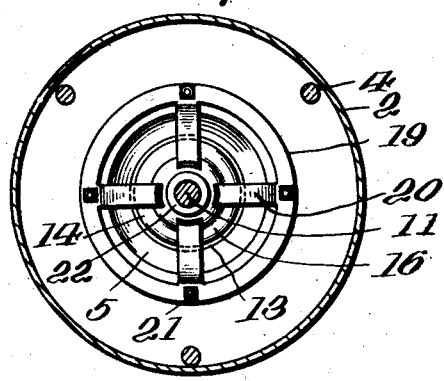
Figure 3 is a section taken on line 3—3 of Figure 1.
Figure 4:
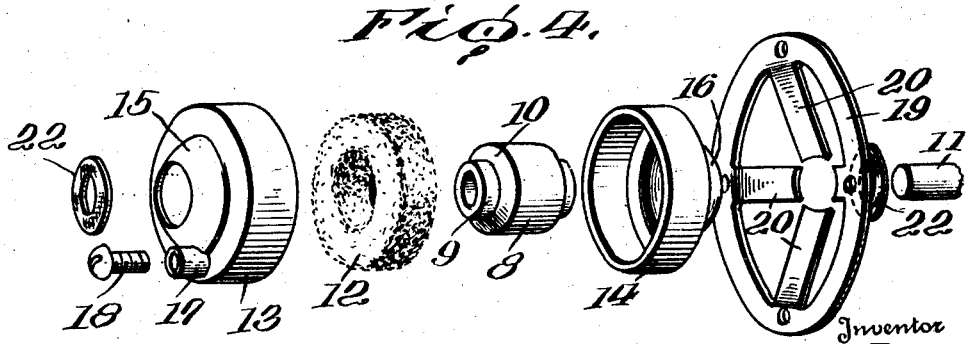
Figure 4 is a perspective view of the bearing and its mounting showing the parts thereof separated.

In the drawing 1 indicates an electric motor enclosed within a sectional housing composed of telescoping sections 2 and 3 which are secured together by bolts 4 so that the sections can be separated. The end of each section is provided with a substantially semi-spherical portion 5 apertured as shown at 6 and provided with a notch as shown at 7 for the purpose hereinafter fully described. As the end of each section is formed exactly alike, the description of one section will be sufficient for both.

My improved construction of bearing comprises a cylindrical bearing 8 which is reduced to form tubular portions 9 with curved shoulders 10, said bearing being formed of powdered copper and graphite and adapted to absorb 20 per cent of its weight in oil so as to form a lubricating bearing for the armature shaft 11 of the electric motor which extends longitudinally through the housing as clearly shown in Figure 1.

The bearing 8 is surrounded by a wool ring 12 which is adapted to be saturated with oil so as to maintain the bearing 8 thoroughly lubricated. The bearing is enclosed in a sectional casing formed of telescoping sections 13 and 14 which form an air-tight casing, the ends of the sections being provided with substantially semi-spherical apertured projections 15 and 16 which are adapted to extend into the substantially semi-spherical end portions of the housing of the motor. The sections 13 are provided with projections 17 forming filling openings which are closed by screws 18, the projections extending into the notches 7 of the housing so as to prevent the bearings from rotating.

The bearings are secured within the semi-circular portions of the housing by retaining members 19 which are in the form of rings having inwardly projecting spring arms 20 which engage the substantially semi-circular portions of the bearing casings so as to hold these bearings within the semi-circular portions of the housing whereby a self-aligning bearing for the armature shaft 11 is provided. The bearing retainers 19 are secured to the inner faces of the end walls of the respective sections of the housing by bolts 21 so that these bearings can be easily and quickly inserted or removed by separating the sectional casings of the housings and removing the bearing retainers from the inside.

In order to compensate for the end play and prevent chattering of the armature shaft caused by the vibration, I provide the armature shaft with collars 11' adjacent each end which are adapted to engage cushioning rings or washers 22 formed of duck impregnated with linseed oil and baked.

In the description I have only described specifically the construction of one bearing for one end of the armature shaft, but as the bearings are constructed exactly alike and retained in position in the same manner, it is thought that the description of one is sufficient for both and anyone skilled in the art can clearly understand the construction of mounting the two bearings for the armature shaft so as to produce a novel form of lubricating bearing as well as a self-aligning bearing.

From the foregoing description it will be seen that I have provided an electric motor with a pair of self-aligning self-lubricating bearings for the armature shaft, which enables the bearings to align themselves after the sectional housing has been placed in position, the bearings being held movably within the pockets formed in the end walls of the housings by spring members.

This application is a division of my application for Electric motors, filed August 12, 1930, Serial Number 474,796, which has matured into Patent No. 1,896,972.

What I claim is:

A self-lubricating bearing for electric motors comprising a bearing formed of a material adapted to absorb lubricant, said bearing being cylindrical in form and reduced to form tubular projections at each end and curved shoulders, a ring of wool surrounding said bearing, a sectional casing formed of two similar shaped telescoping sections inclosing said bearing and ring and forming an air tight chamber having apertured semi-spherical shaped ends through which the tubular bearing portions of said bearing are adapted to extend, the curved shoulders of said bearing fitting in the semi-spherical ends of said sections for sealing the same, one section of said housing being provided with a filling projection in alignment with said ring.

ALBERT G. REDMOND.